United States Patent
Bernhardt et al.

[11] Patent Number: 5,180,215
[45] Date of Patent: Jan. 19, 1993

[54] HYDRAULIC DUAL-CIRCUIT BRAKE SYSTEM

[75] Inventors: Wolfgang Bernhardt, Korntal; Roland Holzmann, Stuttgart; Guenther Schmidt, Tamm-Hohenstange; Lothar Kirstein, Ditzingen; Gerhard Wetzel, Korntal, all of Fed. Rep. of Germany

[73] Assignee: Robert Bosch GmbH, Stuttgart, Fed. Rep. of Germany

[21] Appl. No.: 671,610

[22] Filed: Mar. 19, 1991

[30] Foreign Application Priority Data

Mar. 23, 1990 [DE] Fed. Rep. of Germany ....... 4009302
Oct. 16, 1990 [DE] Fed. Rep. of Germany ....... 4032784

[51] Int. Cl.$^5$ .................................................. B60T 8/32
[52] U.S. Cl. ............................... 303/113.2; 303/116.1
[58] Field of Search ...... 303/116 R, 113 TR, 116 SP, 303/113 R

[56] References Cited

U.S. PATENT DOCUMENTS

| 4,861,118 | 8/1989 | Burckhardt et al. ............. 303/10 |
| 4,900,102 | 2/1990 | Jonnes et al. ................... 303/110 |

FOREIGN PATENT DOCUMENTS

2598991 11/1987 Fed. Rep. of Germany ... 303/116 R
0049579 3/1988 Japan .......................... 303/113 IR
0119461 5/1989 Japan .......................... 303/116 R
0231256 9/1990 Japan .......................... 303/113 TR Primary Examiner—Matthew C. Graham
Attorney, Agent, or Firm—Edwin E. Greigg; Ronald E. Greigg

[57] ABSTRACT

A hydraulic dual-circuit brake system with an anti-skid system and traction control in motor vehicles which has a four-channel hydraulic unit with electromagnetic control valves and a return pump having two separate pump elements. For supplying brake pressure during traction control, an additional hydraulic unit is provided, which has a charging valve for connecting the brake fluid tank to a pump element, which pump element is assigned to a brake circuit containing at least one driven wheel, and a reversing valve for alternatingly connecting this pump element to the master brake cylinder or the brake fluid tank. To provide economical brake pressure supply during traction control, the aforementioned pump element is embodied as a self-aspirating high-pressure pump, and a check valve having a flow direction toward the pump element is incorporated into the connection between the control valves disposed in the brake circuit assigned to this pump element and the inlet of the pump element.

30 Claims, 4 Drawing Sheets

HYDRAULIC DUAL-CIRCUIT BRAKE SYSTEM

BACKGROUND OF THE INVENTION

The invention is based on a hydraulic dual-circuit brake system with an anti-skid system (ABS) and traction control (ASR) for motor vehicles.

In a known dual-circuit brake system of this type (German Patent Document 38 16 073 A, now U.S. Pat. No. 4,900,102), a return pump has a third pumping element acting as a precharge pump, which is disposed between a charging valve embodied as a hydraulically controlled 2/2-way valve and a pumping element associated with the brake circuit of the driven wheels. The control inlet of the charging valve is connected to the brake circuit outlet of the master brake cylinder. When there is control pressure at the control inlet, the charging valve is switched over to its blocking position. During traction control the reversing valve is reversed and thereupon disconnects the brake circuit from the brake circuit output of the master brake cylinder, and connects the brake circuit to the brake circuit outlet of the master brake cylinder via the pressure limiting valve. The third pumping element now supplies the following pumping element of the return pump, which generates a high braking pressure that is present at the inlet to the control valve. This brake pressure is fed via the control valves, embodied as 3/3-way magnet valves, into the wheel brake cylinders of the driven wheels, which are slowed down as a result. If only one driven wheel is spinning, then the control valve associated with the outlet channel for the wheel brake cylinder of the non-spinning driven wheel is moved to its middle position, so that no brake pressure can be built up in the wheel brake cylinder of the driven wheel that is not spinning.

OBJECT AND SUMMARY OF THE INVENTION

The dual-circuit brake system has an advantage that with the elimination of the third pump element of the return pump, an economical brake pressure supply for traction control (ASR) operation is attained. The check valve according to the invention between the self-aspirating pump element of the return pump and the outlet channels communicating with this pump element serves as a pressure gradient valve, which prevents the self-aspirating pump element from producing negative pressure in the wheel brake cylinders, by aspirating ambient air through leaky piston seals and the like, during brake pressure reduction both in ABS and ASR operation. The pressure drop is selected to be great enough that a slight overpressure relative to the atmosphere remains in the wheel brake cylinders. By means of the pressure limiting valve, the brake supply pressure in the ASR mode is limited to a maximum pressure. Excess brake fluid flows into the brake fluid tank, and not into the master brake cylinder.

The dual-circuit brake system according to the invention can have either front axle/rear axle brake circuit distribution or a diagonal brake circuit distribution.

Advantageous modifications and improvements to the dual-circuit brake system are possible with the provisions set forth herein.

If the pumping capacity of the pump element at the onset of traction control is inadequate, for instance because the four-channel hydraulic unit and the brake fluid tank are too far from one another, then in further versions of the invention either a reservoir with a reservoir charging valve and pressure limiting valve or a precharge pump embodied as a low-pressure pump, with a parallel-connected pressure limiting valve, can be used. The reservoir with the reservoir charging valve is connected to the connecting line between the reversing valve and the pressure limiting valve and leads to the brake fluid tank, while the precharge pump is connected between the brake fluid tank and the charging valve.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
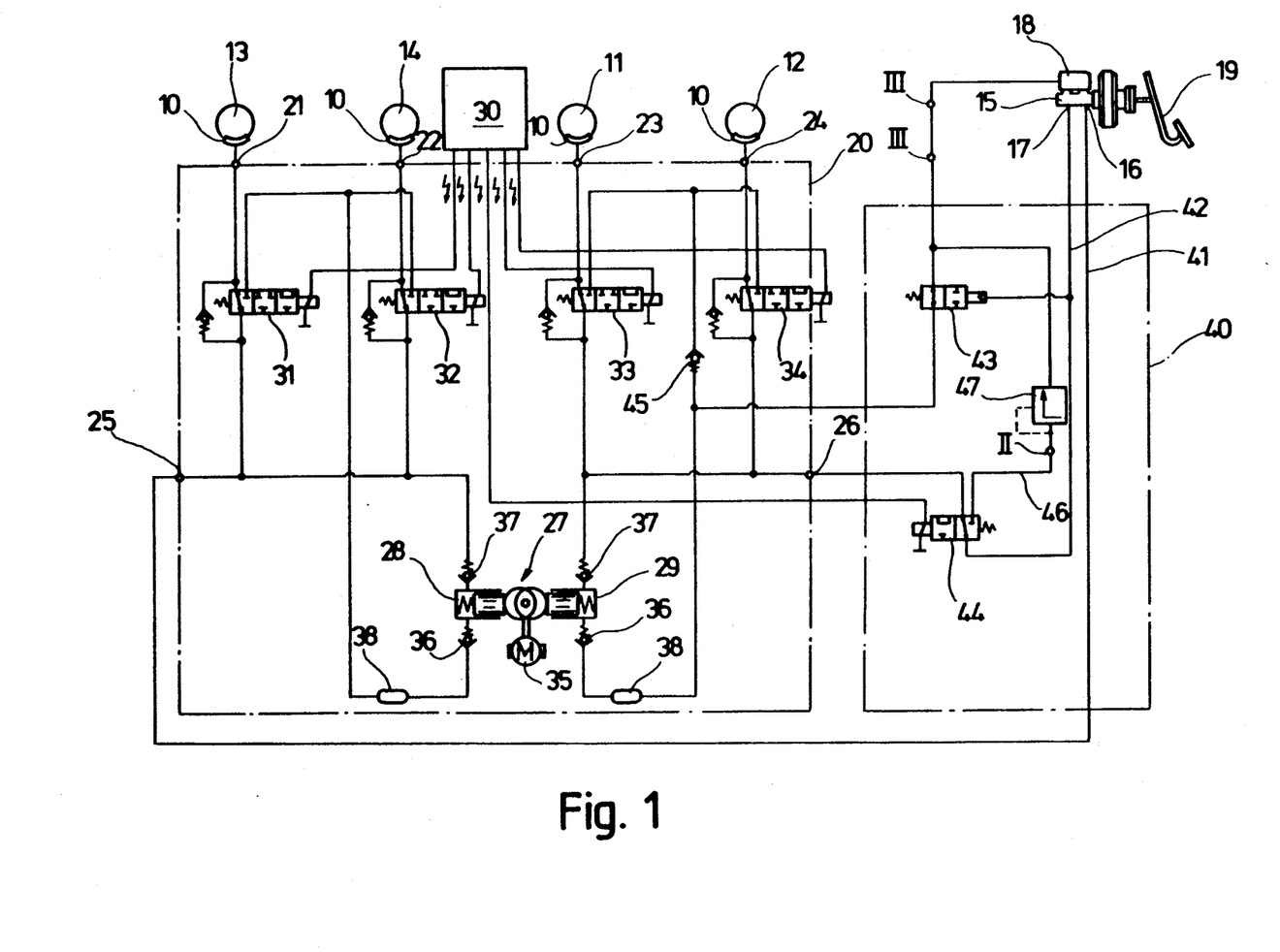
FIG. 1 is a block circuit diagram of a dual circuit brake system with front/rear brake circuit distribution, an anti-skid system and traction control for a passenger car.

In the hydraulic dual-circuit brake system for a passenger car, shown in FIG. 1 in the form of a block circuit diagram and having front/rear, or front-axle/rear-axle brake circuit distribution, an anti-skid system (ABS), and traction control (ASR), the wheel brake cylinders 10 of the driven wheels 11, 12 are disposed in one brake circuit, and the wheel brake cylinders 10 of the non-driven wheels 13, 14 are disposed in the other brake cylinder. The driven wheels 11, 12 are generally the rear wheels of the passenger car. In a manner known per se, the dual-circuit brake system includes a master brake cylinder 15, which has two brake circuit outlets 16, 17 each for connection to one of the two brake circuits, and which communicates with a brake fluid tank 18. Upon actuation of a brake pedal 19, a brake pressure of equal magnitude is fed into the brake circuits via the two brake circuit outlets 16, 17.

The dual-circuit brake system also includes a four-channel hydraulic unit 20, which has four outlet channels 21–24 and two inlet channels 25 and 26. Connected to each outlet channel 21–24 is one wheel brake cylinder 10 of the wheels 11–14. One control valve 31–34, embodied as a 3/3-way magnet valve with spring restoration, is assigned to each outlet channel 21–24. The control valves 31–34 are controlled by an electronic control system 30 and build up a brake pressure dependent on wheel spinning in the associated wheel brake cylinders 10. A return pump 27, which is a component of the four-channel hydraulic unit 20, has two pumping elements 28, 29, which are driven in common by an electric motor 35. The pumping elements 28, 29 serve to pump brake fluid out of the wheel brake cylinders 10 upon pressure reduction in the brakes. One pumping element 28, 29 each is effective in each brake circuit and on the inlet side of the pumping element is connected to the third working connection each of the two control valves 31, 32 or 33, 34 associated with the same brake circuit and on the outlet side of the pumping element to an inlet channel 25 or 26 of the four-channel hydraulic unit 20. Upstream and downstream of each pumping element 28, 29 are a one-way pump inlet valve 36 and a one-way pump outlet valve 37, respectively. A low-pressure reservoir chamber 38 precedes each of the pump inlet valves 36 to allow a pressure reduction independently of the pump supply quantity and to overcome the opening pressure of the pump inlet valve 36. On the inlet side of the pumping element, the control valves 31–34 are connected by their first working connection each to one inlet channel 25 and 26 and with their second working connection to the associated outlet channel 21–24. The control valves 31–34 are embodied in a known manner such that in their first, non-excited basic valve position there is an unhindered passage of brake fluid from the inlet channels 25, 26 to the outlet channels 21–24, as a result of which the brake pressure controlled by the master brake cylinder 15 reaches the wheel brake cylinders 10 of the wheels 11–14. In the second or middle valve position, which is brought about by exciting the control valves 31–34 with half the maximum current, this passage is interrupted, and all the working connections are blocked, so that the brake pressure built up in the wheel brake cylinders 10 is kept constant. In the third or terminated valve position, which is established by valve excitation with maximum current, the outlet channels 21 and 22, and 23 and 24, respectively, and thus the wheel brake cylinders 1 of the wheels 11–14, are connected to the inlet of the pumping elements 28 and 29, respectively, so that to decrease the brake pressure brake fluid can flow out of the wheel brake cylinders 10. The inlet channel 25 of the four-channel hydraulic unit 20 communicates via a first connecting line 41 with the brake circuit outlet 16 of the master brake cylinder 15, and the inlet channel 26 communicates via a second connecting line 42 with the brake circuit outlet 17 of the master brake cylinder 15.

An additional hydraulic unit 40 serves to generate a brake supply pressure in traction control (in the ASR mode). It has a charging valve 43, embodied as a hydraulically controlled 2/2-way valve with spring restoration, and an electromagnetic reversing valve 44. The charging valve 43 communicates by its first valve connection, via the one reservoir chamber and the pump inlet valve 36, to the pump element 29, embodied as self-aspirating, of the return pump 27, and by the other valve connection to the brake fluid tank 18, while its hydraulic control inlet is connected to the connecting line 42 between the brake circuit outlet 17 from the master brake cylinder 15 and the inlet channel 26 of the four-channel hydraulic unit 20, which is assigned to the brake circuit for the driven wheels 11, 12. A one-way check valve 45 is also disposed in the connecting line between the third connections of the control valves 33, 34 and the inlet of the pump element 29, with its flow direction toward the pump element 29. The check valve 4 is disposed in the segment of the line that is located between the third valve connections of the control valves 33, 34 and the connection point of the charging valve 43 on the pump element 29. In its uncontrolled basic valve position, the charging valve opens up the communication between the brake fluid tank 18 and the pump element 29, and blocks it as soon as control pressure reaches its control inlet in response to actuation of the brake pedal 19.

The reversing valve 44 is embodied as a 3/2-way magnet valve with spring restoration and is introduced into the connecting line 42 between the inlet channel 26 and the brake circuit outlet 17; the first valve connection is connected to the inlet channel 26, the second valve connection is connected to the brake circuit outlet 17, and the third valve connection is connected via a connecting line 46 to the brake fluid tank 18. A pressure limiting valve 47 is disposed in the connecting line 46. The reversing valve 44 is embodied such that the inlet channel 26 of the four-channel hydraulic unit 20 is connected, in the basic valve position, to the brake circuit output 17 of the master brake cylinder 15 and, in its working valve position, to the connecting line 46 and thus via the pressure limiting valve 47 to the brake fluid tank 18.

The reversing valve 44 is controlled by the electronic control unit 30 and is switched over whenever the electronic control unit 3 is informed by wheel slip sensors, not shown here, of drive slip of at least one of the driven wheels 11, 12. The return pump 27 starts up, and the self-aspirating pump element 29 aspirates brake fluid from the brake fluid tank 18 via the charging valve 43 and produces a high brake pressure which via the control valves 33, 34 reaches the wheel brake cylinders 10 of the driven wheels 11, 12. If only one of the driven wheels 11 is spinning, for instance, then the control valve 34 of the driven wheel 12 that is not spinning is shifted to the middle valve position, so that the outlet channel 24 is blocked off from the high brake pressure generated by the pump element 29. Via the other control valve 33, brake pressure is built up in the wheel brake cylinder 10 of the spinning driven wheel 11, which is thereby braked. The necessary brake pressure is adjusted by pressure modulation, which is effected by switching of the control valve 33. Excess brake fluid is returned to the brake fluid tank 18 via the reversing valve 44 and the pressure limiting valve 47.

Toward the end of traction control, once no further drive slip is sensed, the electronic control unit 30 switches the control valve 33 over into its terminal valve position that can be brought about by maximum electrical excitation. In this position of the control valve 33, brake fluid flows out of the wheel brake cylinder 10 of the driven wheel 11 via the check valve 45 into the low-pressure reservoir chamber 3 and is returned to the brake fluid tank 18 by the pump element 29 via the pressure limiting valve 47. The brake pressure is reduced further and low-pressure reservoir chamber 38 is pumped empty. Next, the control valve 33 and the reversing valve 44 are returned to their basic valve position. If there is a loss of traction at both driven wheels 11, 12, both control valves 33, 34 are switched back and forth between the basic valve position and the middle valve position for purposes of brake pressure modulation.

Figure 2:
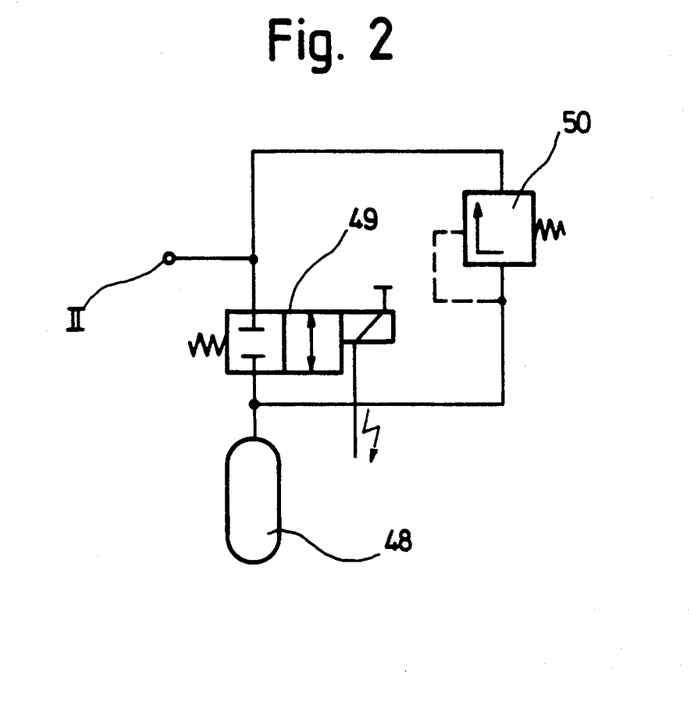
FIG. 2 and FIG. 3 each show an additional component assembly for modifying the dual-circuit brake system of FIG. 1.

In FIG. 2, a component assembly is shown that comprises a reservoir 48, a reservoir charging valve 49 and a pressure limiting valve 50, connected parallel to the reservoir charging valve. This additional component assembly is connected to the connection terminal II in the connecting line 46 between the switchover valve 44 and the brake fluid tank 18 whenever the pumping capacity of the pump element 29 is insufficient, for instance because a very long brake fluid line is necessary between the four-channel hydraulic unit 20 in the brake fluid tank 18.

Figure 3:
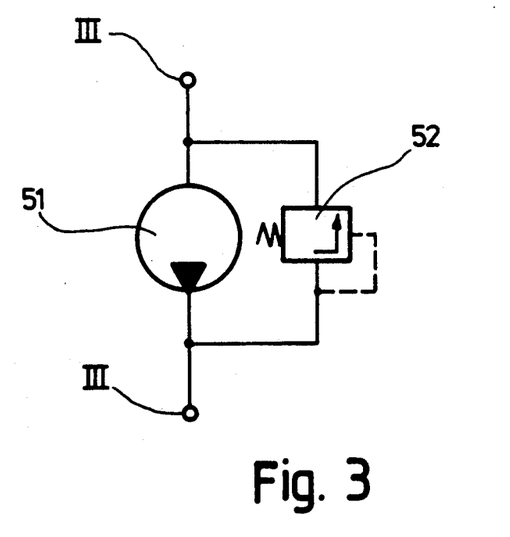

For the same purpose, instead of the component assembly shown in FIG. 2, the additional component assembly sketched in FIG. 3 can be used, comprising a precharge pump 51 and a parallel-connected pressure limiting valve 52, which after disconnection of the connection between the connection terminals III—III can be connected to these connection terminals III-III in the line segment between the brake fluid tank 18 and the charging valve 43.

Figure 4:
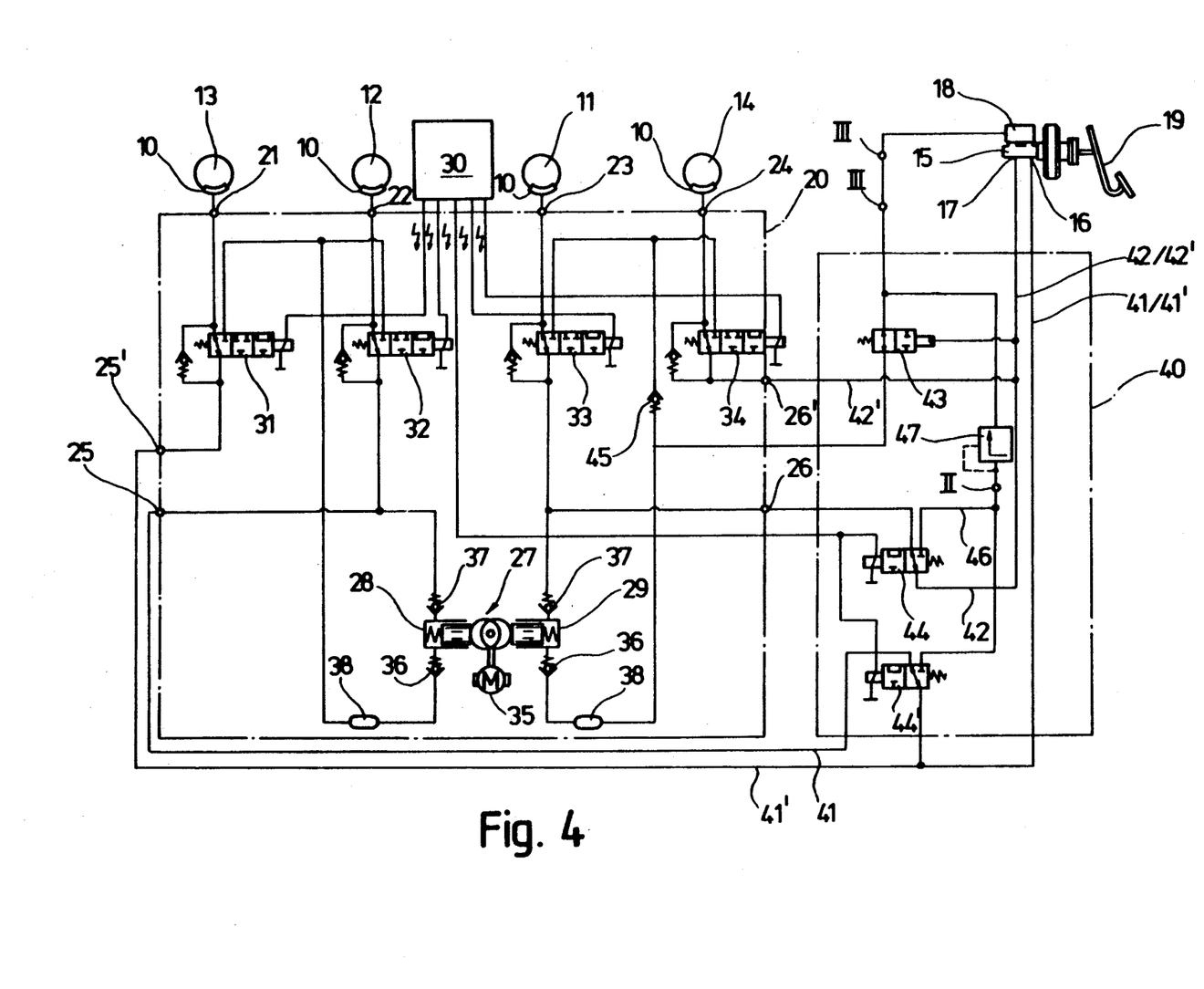
FIG. 4 is a block circuit diagram of a modified dual-circuit brake system with diagonal brake circuit distribution, an anti-skid system and traction control for a passenger car.

In the hydraulic dual-circuit brake system with diagonal brake circuit distribution shown in the form of a block circuit diagram in FIG. 4, with an anti-skid system (ABS) and traction control (ASR) for passenger cars, one driven wheel 11, 12 is disposed in each of two brake circuits. The driven wheels 11, 12 are generally the front wheels of the passenger car. To the extent that the dual circuit brake system matches that shown in FIG. 1 with front/rear brake circuit distribution, identical components are provided with the same reference numerals.

In the four-channel hydraulic unit 20, the two inlet channels 25, 26 are each divided into two channels 25 and 25' and 26 and 26', respectively. As before, the outlets of the pumping elements 28, 29 communicate with the inlet channels 25 and 26, respectively. The control valves 32 and 33, which are assigned to the driven wheels 11, 12 in each brake circuit, are still connected to the inlet side of the inlet channels 25, 26. The control valves 31, 34 assigned to the non-driven wheels 13, 14 are connected on the inlet side to the inlet channels 25' and 26'. While the inlet channels 25 and 26 communicate, as before, with the brake circuit outlets 16 and 17 of the master brake cylinder 15 via the connecting lines 41 and 42, the inlet channels 25' and 26' communicate with these brake circuit outlets 16, 17 through a third and fourth connecting line 41' and 42'. The additional hydraulic unit 40 has a second reversing valve 44' as well, which is embodied identically to the reversing valve 44. This reversing valve 44' is incorporated in the first connecting line 41 between the brake circuit outlet 16 of the master brake cylinder 15 and the inlet channel 25 of the four-channel hydraulic unit 20 in such a way that its first valve connection is connected to the inlet channel 25, its second valve connection is connected to the brake circuit outlet 16, and its third valve connection is connected to the first valve connection of the reservoir connection valve 45.

The reversing valve 44' is likewise triggered by the electronic control system 30 simultaneously with the reversing valve 44. Both switchover valves 44, 44' are always switched over jointly whenever the electronic control unit 30 is informed of drive slip of at least one of the driven wheels 11, 12 by the wheel slip sensors. The pump element 29 of the return pump 27 that is starting up aspirates brake fluid out of the brake fluid tank 18 via the charging valve 43 and produces a high brake pressure that is present on the one hand at the control valve 33 and at the other, via the switched-over reversing valves 44, 44', at the control valve 32. If the driven wheel 11, for instance, is spinning, then the control valve 32, which is associated with the outlet channel 22 for the wheel brake cylinder 10 of the driven wheel 12 that is not spinning, is switched over to the middle position, so that the outlet channel 2 is blocked off from the high brake pressure. Via the other control valve 33, brake pressure is built up in the wheel brake cylinder 10 of the spinning driven wheel 11, which is thus braked. The necessary brake pressure is established by pressure modulation, which is effected by switching the control valve 33. Toward the end of the traction control, once no further loss of traction is sensed, the control valve 33 is switched over by the electronic control unit 30 into its terminal position that can be brought about by maximum electrical excitation. In this terminal position, brake fluid flows out of the wheel brake cylinder 10 of the driven wheel 11 via the check valve 45 into the low-pressure reservoir chamber 38 and is returned to the brake fluid tank 18 by the pump element 29 via the pressure limiting valve 47. Next, the control valve 33 and the two reversing valves 44, 44' are returned to their basic valve position. If there is a loss of traction at both driven wheels 11, 12, then both control valves 32, 33 are switched back and forth between the basic valve position and the middle valve position for purposes of brake pressure modulation.

The component units shown in FIGS. 2 and 3 can also be connected to the dual-circuit brake system of FIG. 4 in the same manner as described for FIG. 1.

Figure 5:
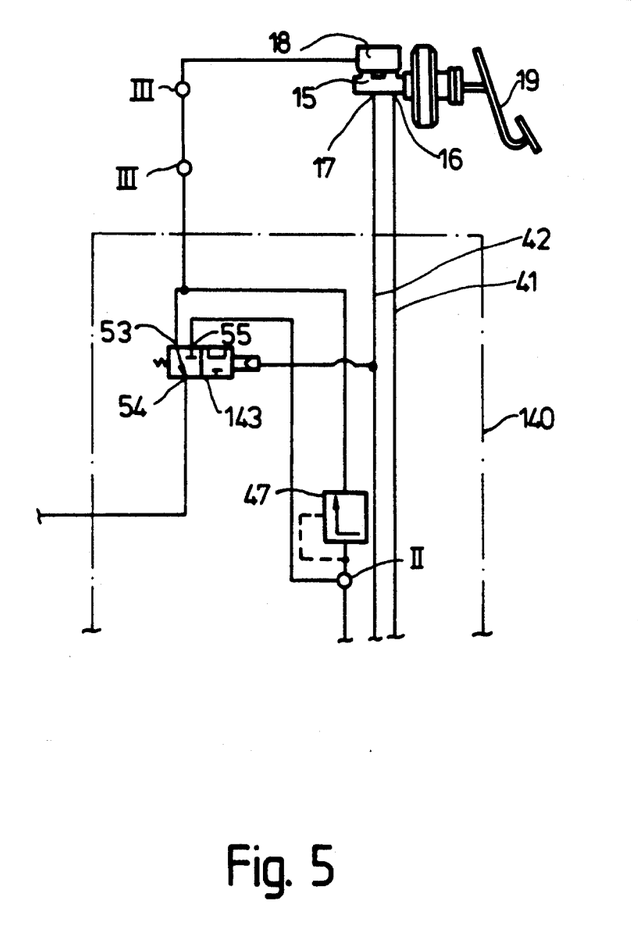
FIG. 5 shows various excerpts from a block circuit diagram of a modified hydraulic unit in the dual-circuit brake system of FIG. 1 or FIG. 4.

In FIG. 5, portions of a modified additional hydraulic unit 40 is shown, in combination with the master brake cylinder 15; this unit can be used instead of the additional hydraulic unit 40 in the dual circuit brake system of FIG. 1 or FIG. 4. The detail shown shows the extent of the modification. Any components not shown are equivalent to those of the additional hydraulic unit 40 of FIGS. 1 and 4. The modification made relates solely to the charging valve 143, which is now embodied as a hydraulically controlled 3/2-way valve. The hydraulic control input of the charging valve is again connected to the brake circuit outlet 17 of the master brake cylinder 15, while of the three controlled valve connections of the charging valve 143, the first valve connection 53 is connected to the brake fluid tank 18; the second valve connection 54 is connected to the connecting line to the inlet of the pump element 29 embodied as a self-aspirating high-pressure pump; and the third valve connection 55 is connected to the inlet of the pressure limiting valve 47. The charging valve 143 is embodied such that the first valve connection 53 communicates with the second valve connection 54, in the uncontrolled basic valve position, and with the third valve connection 55, in the reversed working position. In this way, during ASR operation, the inlet of the pump element 29 embodied as a self-aspirating high-pressure pump, always communicates with the brake fluid tank 18. Excess brake fluid is returned to the brake fluid tank 18 during ASR operation by the pump element 29 (FIG. 1) or the pump elements 28, 29 (FIG. 4) via the switched-over reversing valve 44 or the switched-over reversing valves 44, 44' and the pressure limiting valve 47. If the brake pedal 19 is actuated during ASR operation, then the charging valve 143 is switched over by the brake pressure built up in the master brake cylinder 15, while the switchover valve 44, or the two switchover valves 44, 44', still remain in their working position for a few more milliseconds. Upon switchover of the charging valve 143, the pressure limiting valve 47 is bypassed, and the brake fluid preloaded into the brake circuits during ASR operation are thereby immediately relieved in the direction of the brake fluid tank 18, bypassing the pressure limiting valve 47. Thus upon initiation of braking during traction control operation (ASR) a rapid reduction of pressure is achieved, so that the ABS mode is functionally ready very much faster.

The invention is not limited to the exemplary embodiments described. For instance, each control valve may be embodied as a combination of two 2/2-way magnet valves. Then one 2/2-way magnet valve forms an inlet valve, which in its unexcited basic position makes the unhindered passage from the inlet channel to the associated outlet channel possible and its working position blocks this passage. Conversely, the other 2/2-way magnet valve, acting as a so-called outlet valve, establishes communication of the associated outlet channel with the associated pumping element in its working position brought about by magnet excitation, and blocks this passage in its unexcited basic position. In the so-called pressure holding position, both 2/2-way magnet valves of the valve combination, assume their blocking position.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic dual-circuit brake system with an anti-skid system and traction control for motor vehicles having driven and non-driven wheels, having a master brake cylinder with first and second separate brake circuit outlets (16, 17) for controlling a brake pressure in first and second brake circuits by actuation of a brake pedal; a brake fluid tank that communicates with the master brake cylinder; a four-channel hydraulic unit (20) connected to said first and second brake circuit outlets of the master brake cylinder, said four-channel hydraulic unit has first and second outlet channels (21, 22) for connecting brake fluid to wheel brake cylinders (10) of the non-driven vehicle wheels (13, 14), and third and fourth outlet channels (23, 24) for connecting brake fluid to wheel brake cylinders (10) of the driven wheels (11, 12), first and second electromagnetic control valves (31 and 32) associated one each with said first and second outlet channels (21, 22) for controlling a brake pressure dependent on wheel slip of said non-driven wheels, third and fourth electromagnetic control valves (33, 34) associated one each with said third and fourth outlet channels (23, 24) for controlling a brake pressure dependent on wheel slip of said driven wheels, and a return pump (27) with first and second separate pumping elements (28, 29), said first pumping element (28) operative in said first brake circuit, for returning brake fluid from the wheel brake cylinders of said non-driven wheels back to said first brake circuit upon brake pressure reduction, said second pumping element (29) operative in said second brake circuit for returning brake fluid from the wheel brake cylinders of said driven wheels back to said second brake circuit upon brake pressure reduction, an inlet side of said first pumping element (28) is connected to an outlet side of said first and second electromagnetic control valves with an outlet side of said first pumping element connected to the first brake circuit outlet of the master brake cylinder; an inlet side of said second pumping element (29) is connected to an outlet side of said third and fourth electromagnetic control valves with an outlet side of said second pumping element connected to the second brake circuit outlet of the master brake cylinder; and having a second hydraulic unit (40) for generating a brake supply pressure in traction control, said second hydraulic unit has a hydraulically controlled charging valve (43), which at least in traction control connects said input side of said second pump element of the return pump with the brake fluid tank, and has a first electromagnetic reversing valve (44), incorporated into a connection between an output side of said second pump element and said second brake circuit outlet of the master brake cylinder, said reversing valve, in traction control, disconnects said second pump element on the output side from the master brake cylinder and with an interpolation of a pressure limiting valve (47) connects the output side of said second pump element to the brake fluid tank, said second pump element (29) of the return pump (27) is embodied as a self-aspiring high-pressure pump, and that a check valve (45) having a flow direction toward the inlet of said second pump element is incorporated into a line connecting the inlet of said second pump element (29) to the third and fourth control valves (33, 34) of the second brake circuit associated with the second pump element (29).

2. A brake system as defined by claim 1, in which the wheel brake cylinders of the driven wheels are assigned to a common brake circuit, said four-channel hydraulic unit (20) has first and second inlet channels (25, 26) which communicate, each via first and second connecting lines (41, 42), respectively with said first and second brake circuit outlets (16, 17) of the master brake cylinder (15); the respective first and second control valves (31, 32) of said non-driven wheels and third and fourth control valves (33, 34) of said driven wheels, assigned to said first and second brake circuits are connected on an inlet side with an outlet side of said first and second pump elements (28, 29) respectively of the return pump (27) and connected to said first and second inlet channels (25, 26) respectively; the second pump element (29) is assigned to the brake circuit of the driven wheels (11 and 12); that the first reversing valve (44) is incorporated into the connecting line between the inlet channel (26), assigned to the second brake circuit for the driven wheels (11, 12), of the four-channel hydraulic unit (20) and the master brake cylinder (15).

3. A brake system as defined by claim 2, in which the first reversing valve (44) is embodied as a 3/2-way magnet valve including first, second, and third valve connections with spring restoration, the first valve connection communicates with the inlet channel (26) of the four-channel hydraulic unit (20) assigned to the second brake circuit for the driven wheels (11, 12); the second valve connection communicates with second brake outlet circuit of the master brake cylinder (15); and the third valve connection communicates via the pressure limiting valve (47) with the brake fluid tank (18); and the first reversing valve (44) is embodied such that the first valve connection communicates with the second valve connection in an unexcited basic valve position and with the third valve connection in a working valve position, and the respectively uncoupled third and second valve connection is blocked off respectively.

4. A brake system as defined in claim 3, in which a reservoir (48) is preceded by a reservoir charging valve (49) embodied as a 2/2-way valve and a second pressure limiting valve (50) parallel to the reservoir charging valve is connected to a connection between the first reversing valve (44) and the pressure limiting valve (47).

5. A brake system as defined by claim 3, in which a precharge pump (51), embodied as a low-pressure pump and having a parallel-connected third pressure limiting valve (52), is disposed in series with the charging valve (43; 143).

6. A brake system as defined by claim 3, in which the charging valve (43) is a hydraulically controlled 2/2-way valve with spring restoration, a hydraulic control inlet of said charging valve communicates with said second brake circuit outlet (17) of the master brake cylinder (15), and said charging valve is embodied such that in an uncontrolled basic position said charging valve connects the inlet of the second pump element (29), of the return pump (27), to the brake fluid tank (18), and in a reversed working position said 2/2 way charging valve disconnects this connection.

7. A brake system as defined by claim 3, in which said charging valve (143) is a hydraulically controlled 3/2-way valve which includes a hydraulic control inlet which communicates with said second brake circuit outlet (17) of the master brake cylinder (15), and said 3/2 way charging valve is embodied such that in an uncontrolled basic position said 3/2 way charging valve connects the inlet of the second pump element (29) of the return pump (27), to the brake fluid tank (18), and in a reversed working position said 3/2 way charging valve disconnects this connection and bypasses said pressure limiting valve (47).

8. A brake system as defined by claim 2, in which a reservoir (48) is preceded by a reservoir charging valve (49) embodied as a 2/2-way valve and a second pressure limiting valve (50) parallel to the reservoir charging valve is connected to a connection between the first reversing valve (44) and the pressure limiting valve (47).

9. A brake system as defined by claim 2, in which a precharge pump (51), embodied as a low-pressure pump and having a parallel-connected third pressure limiting valve (52), is disposed in series with the charging valve (43; 143).

10. A brake system as defined by claim 2, in which the charging valve (43) is a hydraulically controlled 2/2-way valve with spring restoration, a hydraulic control inlet of said charging valve communicates with said second brake circuit outlet (17) of the master brake cylinder (15), and said charging valve is embodied such that in an uncontrolled basic position said charging valve connects the inlet of the second pump element (29), of the return pump (27), to the brake fluid tank (18), and in a reversed working position said 2/2 way charging valve disconnects this connection.

11. A brake system as defined by claim 2, in which said charging valve (143) is a hydraulically controlled 3/2-way valve which includes a hydraulic control inlet which communicates with said second brake circuit outlet (17) of the master brake cylinder (15), and said 3/2 way charging valve is embodied such that in an uncontrolled basic position said 3/2 way charging valve connects the inlet of the second pump element (29) of the return pump (27), to the brake fluid tank (18), and in a reversed working position said 3/2 way charging valve disconnects this connection and bypasses said pressure limiting valve (47).

12. A brake system as defined by claim 1, in which a reservoir (48) is preceded by a reservoir charging valve (49) embodied as a 2/2-way valve and a second pressure limiting valve (50) parallel to the reservoir charging valve is connected to a connection between the first reversing valve (44) and the pressure limiting valve (47).

13. A brake system as defined by claim 12, in which the charging valve (43) is a hydraulically controlled 2/2-way valve with spring restoration, a hydraulic control inlet of said charging valve communicates with said second brake circuit outlet (17) of the master brake cylinder (15), and said charging valve is embodied such that in an uncontrolled basic position said charging valve connects the inlet of the second pump element (29), of the return pump (27), to the brake fluid tank (18), and in a reversed working position said 2/2 way charging valve disconnects this connection.

14. A brake system as defined by claim 12, in which said charging valve (143) is a hydraulically controlled 3/2-way valve which includes a hydraulic control inlet which communicates with said second brake circuit outlet (17) of the master brake cylinder (15), and said 3/2 way charging valve is embodied such that in an uncontrolled basic position said 3/2 way charging valve connects the inlet of the second pump element (29) of the return pump (27), to the brake fluid tank (18), and in a reversed working position said 3/2 way charging valve disconnects this connection and bypasses said pressure limiting valve (47).

15. A brake system as defined by claim 1, in which a precharge pump (51), embodied as a low-pressure pump and having a parallel-connected third pressure limiting valve (52), is disposed in series with the charging valve (43; 143).

16. A brake system as defined by claim 15, in which the charging valve (43) is a hydraulically controlled 2/2-way valve with spring restoration, a hydraulic control inlet of said charging valve communicates with said second brake circuit outlet (17) of the master brake cylinder (15), and said charging valve is embodied such that in an uncontrolled basic position said charging valve connects the inlet of the second pump element (29), of the return pump (27), to the brake fluid tank (18), and in a reversed working position said 2/2 way charging valve disconnects this connection.

17. A brake system as defined by claim 15, in which said charging valve (143) is a hydraulically controlled 3/2-way valve which includes a hydraulic control inlet which communicates with said second brake circuit outlet (17) of the master brake cylinder (15), and said 3/2 way charging valve is embodied such that in an uncontrolled basic position said 3/2 way charging valve connects the inlet of the second pump element (29) of the return pump (27), to the brake fluid tank (18), and in a reversed working position said 3/2 way charging valve disconnects this connection and bypasses said pressure limiting valve (47).

18. A brake system as defined by claim 1, in which the charging valve (43) is a hydraulically controlled 2/2-way valve with spring restoration, a hydraulic control inlet of said charging valve communicates with said second brake circuit outlet (17) of the master brake cylinder (15), and said charging valve is embodied such that in an uncontrolled basic position said charging valve connects the inlet of the second pump element (29), of the return pump (27), to the brake fluid tank (18), and in a reversed working position said 2/2 way charging valve disconnects this connection.

19. A brake system as defined by claim 18, in which said charging valve (143) is a hydraulically controlled 3/2-way valve which includes a hydraulic control inlet which communicates with said second brake circuit outlet (17) of the master brake cylinder (15), and said 3/2 way charging valve is embodied such that in an uncontrolled basic position said 3/2 way charging valve connects the inlet of the second pump element (29) of the return pump (27), to the brake fluid tank (18), and in a reversed working position said 3/2 way charging valve disconnects this connection and bypasses said pressure limiting valve (47).

20. A brake system as defined by claim 1, in which said charging valve (143) is a hydraulically controlled 3/2-way valve which includes a hydraulic control inlet which communicates with said second brake circuit outlet (17) of the master brake cylinder (15), and said 3/2 way charging valve is embodied such that in an uncontrolled basic position said 3/2 way charging valve connects the inlet of the second pump element (29) of the return pump (27), to the brake fluid tank (18), and in a reversed working position said 3/2 way charging valve disconnects this connection and bypasses said pressure limiting valve (47).

21. A hydraulic dual-circuit brake system with an anti-skid system and traction control for motor vehicles having first and second driven wheels and first and second non-driven wheels, having a master brake cylinder with first and second separate brake circuit outlets (16, 17) for controlling a brake pressure in first and second brake circuits by actuation of a brake pedal; a brake fluid tank that communicates with the master brake cylinder; a four-channel hydraulic unit (20) connected to said first and second brake circuit outlets of the master brake cylinder, said four-channel hydraulic unit has first and second outlet channels (21, 22) for connecting brake fluid to wheel brake cylinders (10) of said first non-driven vehicle wheel (13) and said first driven wheel (12), and third and fourth outlet channels (23, 24) for connecting brake fluid to wheel brake cylinders (10) of said second driven wheel (11) and said second non-driven wheel (14), first and second electromagnetic control valves (31 and 32) associated one each with said first and second outlet channels (21, 22) for controlling a brake pressure dependent on wheel slip or said first non-driven wheel and said first driven wheel, third and fourth electromagnetic control valves (33, 34) associated one each with said third and fourth outlet channels (23, 24) for controlling a brake pressure dependent on wheel slip of said second driven wheel and said second non-driven wheel, and a return pump (27) with first and second separate pumping elements (28, 29), said first pumping element (28) operative in said first brake circuit, for returning brake fluid from the wheel brake cylinders of said first non-driven wheel and said first driven wheel back to said first brake circuit upon brake pressure reduction, said second pumping element (29) operative in said second brake circuit for returning brake fluid from the wheel brake cylinders of said second driven wheel and said second non-driven wheel back to said second brake circuit upon brake pressure reduction, an inlet side of said first pumping element (28) is connected to an outlet side of said first and second electromagnetic control valves, an inlet side of said second pumping element (29) is connected to an outlet side of said third and fourth electromagnetic control valves, said four-channel hydraulic unit (20) has first, second, third, and fourth inlet channels (25, 25', 26, 26') which communicate via first, second, third, and fourth connecting lines (41, 41', 42, 42') with the first and second brake circuit outlets (16, 17) of the master brake cylinder (15); the first and second pump elements (28, 29) of the return pump (27) are connected on an output side to said first and third inlet channels (25, 26) to which the second and third control valves (32, 33) for the second and third outlet channels (22, 23) of the wheel brake cylinders (10) of the first and second driven wheels (12, 11) are connected; a second hydraulic unit (40) for generating a brake supply pressure in traction control, said second hydraulic unit has a hydraulically controlled charging valve (43), which at least in traction control connects said input side of said second pump element of the return pump with the brake fluid tank, and has a first electro-magnetic reversing valve (44), incorporated into a connection between an output side of said second pump element and said second brake circuit outlet of the master brake cylinder, said first electromagnetic reversing valve (44) is disposed in the third connecting line (2) leading from said second brake circuit outlet (17) of the master brake cylinder (15) to said second inlet channel (26), said second inlet channel communicates with said second pump element (29); a second reversing valve (44') is disposed in the first connecting line (41) leading from the said first brake circuit outlet (16) of the master brake cylinder (15) to said first inlet channel (25), which communicates with the outlet side of said first pump element (28); and that the second reversing valve (44')) is embodied such that in traction control, the first inlet channel (25) is disconnected from the master brake cylinder (15) and is connected to a third connecting line (46) between the first reversing valve (44) and the pressure limiting valve (47), in traction control the electromagnetic reversing valve disconnects said second pump element on the output side from the master brake cylinder and with an interpolation of a pressure limiting valve (47) connects the output side of said second pump element to the brake fluid tank, said second pump element (29) of the return pump (27) is embodied as a self-aspirating high-pressure pump, and that a check valve (45) having a flow direction toward the inlet of said second pump element is incorporated into a line connecting the inlet of said second pump element (29) to the third and fourth control valves (33, 34) of the second brake circuit associated with the second pump element (29).

22. A brake system as defined by claim 21, in which said first and second electromagnet reversing valves (44, 44') are embodied as 3/2-way magnet valves each including first, second, and third valve connections with spring restoration, the first valve connection of said first and second 3/2-way electromagnet reversing valve (44, 44') communicates with said second and first inlet channels (26 and 25), respectively, of the four-channel hydraulic unit (20), the second valve connection of said first and second 3/2-way electromagnet reversing valve (44, 44') communicates with said first and second brake circuit outlet (17 and 16), respectively, of the master brake cylinder (15), and the third valve connection of said first and second 3/2-way electromagnet reversing valve (44, 44') communicates respectively via the pressure limiting valve (47) with the brake fluid tank (18); and the first and second electromagnet reversing valves (44, 44') are embodied such that the first valve connection of each as said first and second reversing valves communicates internally respectively with the second valve connection, in the unexcited basic valve position, and with the third valve connection, in the working valve position, and the respectively uncoupled third and second valve connection is blocked off.

23. A brake system as defined by claim 22, in which a reservoir (48) is preceded by a reservoir charging valve (49) embodied as a 2/2-way valve and a second pressure limiting valve (50) parallel to the reservoir charging valve is connected to a connection between the first reversing valve (44) and the pressure limiting valve (47).

24. A brake system as defined by claim 22, in which a precharge pump (51), embodied as a low-pressure pump and having a parallel-connected third pressure limiting valve (52), is disposed in series with the charging valve (43; 143).

25. A brake system as defined by claim 22, in which the charging valve (43) is a hydraulically controlled 2/2-way valve with spring restoration, a hydraulic control inlet of said charging valve communicates with said second brake circuit outlet (17) of the master brake cylinder (15), and said charging valve is embodied such that in an uncontrolled basic position said charging valve connects the inlet of the second pump element (29), of the return pump (27), to the brake fluid tank (18), and in a reversed working position said 2/2 way charging valve disconnects this connection.

26. A brake system as defined by claim 22, in which said charging valve (143) is a hydraulically controlled 3/2-way valve which includes a hydraulic control inlet which communicates with said second brake circuit outlet (17) of the master brake cylinder (15), and said 3/2 way charging valve is embodied such that in an uncontrolled basic position said 3/2 way charging valve connects the inlet of the second pump element (29) of the return pump (27), to the brake fluid tank (18), and in a reversed working position said 3/2 way charging valve disconnects this connection and bypasses said pressure limiting valve (47).

27. A brake system as defined by claim 21, in which a reservoir (48) is preceded by a reservoir charging valve (49) embodied as a 2/2-way valve and a second pressure limiting valve (50) parallel to the reservoir charging valve is connected to a connection between the first reversing valve (44) and the pressure limiting valve (47).

28. A brake system as defined by claim 21, in which a precharge pump (51), embodied as a low-pressure pump and having a parallel-connected third pressure limiting valve (52), is disposed in series with the charging valve (43; 143).

29. A brake system as defined by claim 21, in which the charging valve (43) is a hydraulically controlled 2/2-way valve with spring restoration, a hydraulic control inlet of said charging valve communicates with said second brake circuit outlet (17) of the master brake cylinder (15), and said charging valve is embodied such that in an uncontrolled basic position said charging valve connects the inlet of the second pump element (29), of the return pump (27), to the brake fluid tank (18), and in a reversed working position said 2/2 way charging valve disconnects this connection.

30. A brake system as defined by claim 21, in which said charging valve (143) is a hydraulically controlled 3/2-way valve which includes a hydraulic control inlet which communicates with said second brake circuit outlet (17) of the master brake cylinder (15), and said 3/2 way charging valve is embodied such that in an uncontrolled basic position said 3/2 way charging valve connects the inlet of the second pump element (29) of the return pump (27), to the brake fluid tank (18), and in a reversed working position said 3/2 way charging valve disconnects this connection and bypasses said pressure limiting valve (47).

* * * * *